Nov. 24, 1970   L. G. FJELLSTEDT   3,543,006
ELECTRIC HEATING SYSTEM
Filed Dec. 1, 1967
2 Sheets-Sheet 1

INVENTOR.
Leif Gösta Fjellstedt
BY
Armand O. Venander
his ATTORNEY

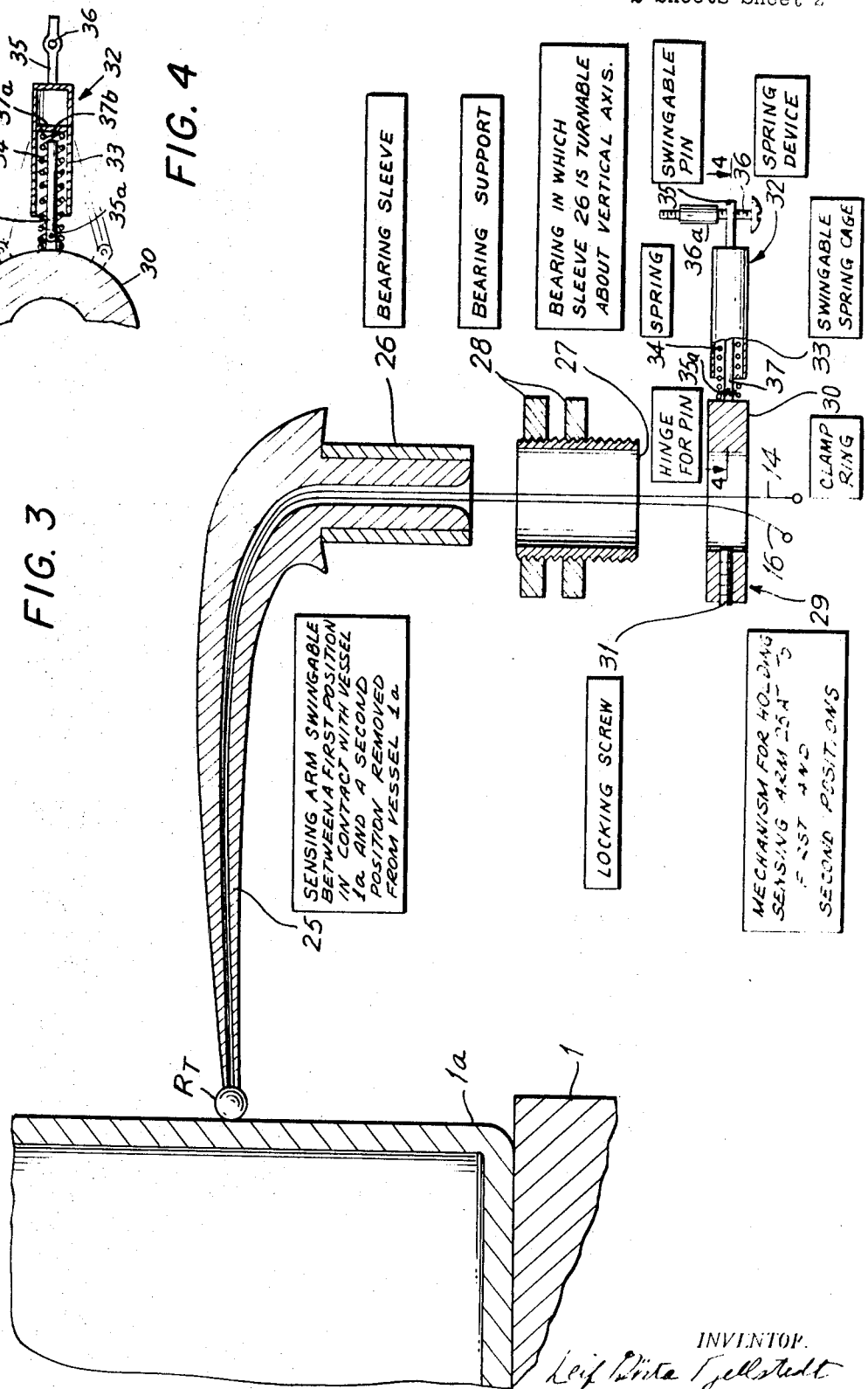

United States Patent Office 3,543,006
Patented Nov. 24, 1970

3,543,006
ELECTRIC HEATING SYSTEM
Leif Gösta Fjellstedt, Sollentuna, Sweden, assignor to Aktiebolaget Electrolux, Stockholm, Sweden, a corporation of Sweden
Filed Dec. 1, 1967, Ser. No. 687,338
Claims priority, application Sweden, Dec. 2, 1966, 16,585/66
Int. Cl. H05b 1/02
U.S. Cl. 219—494                     7 Claims

ABSTRACT OF THE DISCLOSURE

An electric heating system provided with a heating element having a surface for heating thereon an objective of heating, such as an object adapted to hold material to be heated, for example, a first member intermittently or periodically functioning in successive units of time to sense the increase in temperature of the heating objective which prevails at sensing occasions while the heating objective is being heated by the heating element, and a second member which evaluates the sensing results of the first member and functions to disconnect the heating element from its source of electrical energy at a definite time at which the residual heat of the heating element can be utilized to continue heating of the heating objective to a predetermined elevated temperature and avoid overshooting the predetermined elevated temperature to which it is desired to heat the primary objective.

BRIEF SUMMARY OF THE INVENTION

My invention relates to an electric heating system in which the supply of electrical energy to an electrical heat delivery member, such as a heating element, for example, is controlled responsive to the temperature of the primary objective of heating which directly receives heat from the surface of the heating element.

In electric heating systems of this kind it has been the practice heretofore to employ temperature sensing members, such as thermistors, for example, which measure the temperature of the primary objective being heated by the heating element, such temperature sensing members being associated with suitable controls and functioning to disconnect the heating element from the source of electrical energy when the primary objective being heated, such as a cooking vessel, for example, reaches a predetermined elevated temperature. In systems of this kind the residual heat of a heating element continues to effect heating of the primary objective after the supply of electrical energy has been discontinued and heats the primary objective to a higher temperature than that desired, thereby overshooting the predetermined elevated temperature to which it is desired to heat the primary objective.

In such cases, when it has been possible under certain operating conditions to avoid overshooting and heating a primary objective to a higher temperature than the predetermined elevated temperature desired by controlling the supply of electrical energy to the heating element so that it will function properly, when the primary objective, such as a cooking vessel, is of medium size, overshooting is unavoidable when the primary objective is a smaller one. The residual heat of the heating element exercises greater influence on a small primary objective than on a primary objective of medium size. If a large primary objective is to be heated by the heating element, the source of electrical energy prematurely will be disconnected from the heating element, and the primary objective will not reach the predetermined elevated temperature.

The object of my invention is to provide an electric heating system which is capable under all operating conditions encountered to utilize fully the residual heat of a heating element to supply heat directly to an objective of heating and avoid overshooting the predetermined elevated temperature to which it is desired to heat the primary objective of heating. I accomplish this by providing a first member intermittently functioning in successive units of time to sense the increase in temperature of the heating objective which prevails at sensing occasions while the objective of heating is being heated by the heating element, and a second member which evaluates the sensing results of the first member and functions to disconnect the heating element from its source of electrical energy at a definite time at which the residual heat of the heating element can be utilized to continue heating of the objective of heating to a predetermined elevated temperature and avoid overshooting the predetermined elevated temperature to which it is desired to heat the primary objective.

BRIEF DESCRIPTION OF THE SEVERAL VIEWS OF THE DRAWING

In the drawing.

FIG. 3 is an exploded sectional view illustrating one manner for holding the temperature sensing member of FIG. 1 in its active and inactive positions; and FIG. 4 is a fragmentary horizontal sectional view taken at line 4—4 of FIG. 3.

DETAILED DESCRIPTION

Figure 1:
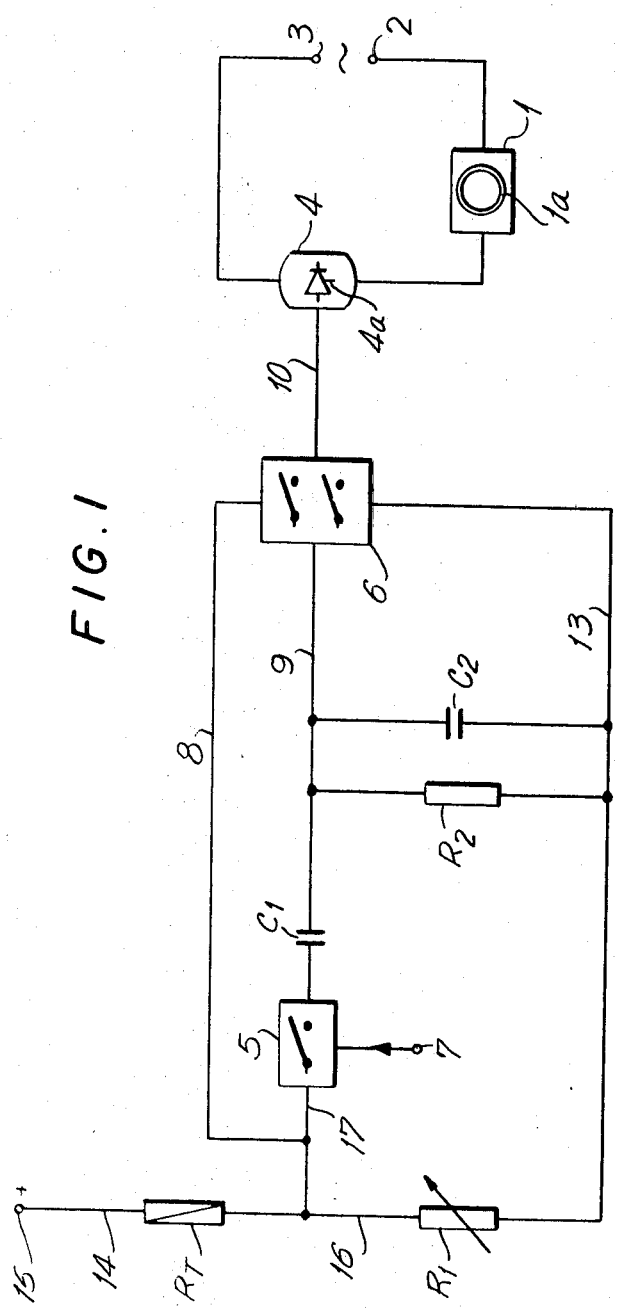
FIG. 1 illustrates diagrammatically an electric heating system embodying my invention.

Referring to the drawing, I have shown my invention in connection with an electric heating system which includes an electrical heating element 1, such as a hot plate, for example, upon which a cooking vessel or utensile diagrammatically represented at 1a is adapted to be positioned. The vessel 1a, which may be referred to as the primary objective of heating, is in good heat conducting contact with the surface of the heating element 1 and receives heat directly therefrom.

The heating element 1 forms part of a circuit which may be connected and disconnected to and from an alternating current source of electrical energy 2, 3 by a thyristor 4. Although a single thyristor 4 is illustrated in FIG. 1, it will be understood that several thyristors may be employed in the electric heating system embodying my invention.

The temperature of the objective of heating 1a is sensed by a thermistor $R_T$ having one terminal connected by a conductor 14 to a positive (+) source of direct current, as indicated at 15, whose voltage is stabilized, and having its other terminal connected in series relation with a variable resistor $R_1$ by a conductor 16, the resistor $R_1$ serving as a setting device. The thermistor $R_T$ and variable resistor $R_1$ together may be referred to as a voltage divider.

As shown in FIG. 3, the thermistor $R_T$ may be carried at the outer free end of an arm 25 swingable between a first active position in contact with the vessel 1a and a second inactive position removed from the vessel 1a. The arm 25 is formed with an elongated passageway through which extend the conductors 14 and 16, the ends of the conductors being connected to the end of the thermistor $R_T$ insulated from the arm 25 in any suitable manner.

The conductor 16 is connected by a conductor 17 to one terminal of a gating device 5, the opposite terminal of which is connected by a conductor 9 to one terminal of a second gating device 6. The gating devices 5 and 6 also may be referred to as "gates." The conductor 17 functions to energize gating device 5 from the voltage divider $R_T$–$R_1$ and may comprise a switch member, such as a transistor, for example, which periodically closes and opens responsive to a periodical pulse series connected to a terminal 7.

The other terminal of the gate 5, which is connected by the conductor 9 to the gate 6, may be referred to as the "output side" thereof. A capacitor $C_1$ is connected in the conductor 9 at the output side of the gate 5. The conductor 17 is connected by a conductor 8 to the second gate 6, and the other terminal of the variable resistor $R_1$ is also connected by a conductor 13 to the second gate 6. The conductor 13 may be grounded or connected to a reference potential. A resistor $R_2$ and capacitor $C_2$ are connected in parallel between the conductors 9 and 13. The resistor $R_2$ and capacitor $C_2$ are connected to the conductor 9 at a zone thereof between the capacitor $C_1$ and the second gate 6. As seen in FIG. 1, the second gate 6, which is diagrammatically represented by two switches, is connected by a conductor 10 to the thyristor 4 or more exactly, to an electrode 4a of the thyristor 4 which functions as a control electrode.

Figure 2:
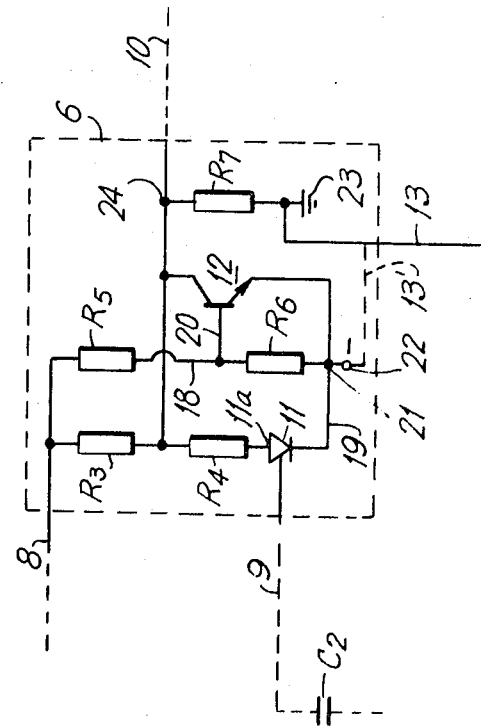
FIG. 2 illustrates diagrammatically in greater detail a part shown in FIG 1.

As diagrammatically shown in FIG. 2, the second gate 6 comprises resistors $R_3$ to $R_7$, a thyristor 11 and an NPN-transistor 12. The conductor 9 from the first gate 5 is connected to the thyristor 11. The terminals of the resistor $R_3$ are respectively connected to conductors 8 and 10; and the terminals of the resistor $R_4$ are respectively connected to the thyristor 11 and to the conductor 10. The resistors $R_5$ and $R_6$ are connected in series relation by a conductor 18 between the conductor 8 and a conductor 19 having one end thereof connected to the thyristor 11 and the opposite end thereof connected to the conductor 10. The transistor 12 is connected in the conductor 19 and has a connection 20 therefrom to the conductor 18. The resistor $R_6$ is connected to the conductor 19 at a region 21 which is between the thyristor 11 and transistor 12 and connected to a negative (−) source of direct current, as indicated at 22.

One terminal of the resistor $R_7$ is grounded at 23 and the opposite end thereof is connected to the conductor 10 at 24 between the conductor 20 and the electrode 4a of thyristor 4. The conductor 13 is connected to the ground terminal 23 but may instead be connected to terminal 22, viz. the negative source of direct current.

The operation of the electric heating system illustrated in the drawing is substantially as follows: It will be assumed that the objective of heating 1a is positioned on the surface of the heating element 1, which is connected to the alternating current source of electrical energy 2, 3 and with the arm 25 being in its first active position with the thermistor $R_T$ in contact with the vessel 1a. As the thyristor 11 and the transistor 12 are non-conductive, the thyristor 4 will be triggered to its conductive state due to the positive voltage transferred to conductor 10 from conductor 8. When this occurs electrical energy will be supplied to the electrical heating element 1.

While the objective of heating 1a is being heated, the resistance of the temperature sensing thyristor $R_T$ is changing continuously in such manner that the voltage divider $R_T$–$R_1$ can provide a source of direct current of continuously increasing voltage. This continuously increasing voltage is sampled by the gate 5 and is transferred to the capacitor $C_1$ at subsequent time intervals which are distributed regularly due to the pulse series referred to above. Since the voltage is a function of the temperature of the objective of heating 1a, its temperature is sensed successively during heating of the primary objective. At each sensing occasion a charge will be supplied to the capacitor $C_1$, the magnitude of which is a function of the difference between the voltage at the sensing occasion and the voltage at the preceding sensing occasion when the capacitor $C_1$ was charged to the voltage then prevailing.

At each sensing occasion a charge also is supplied to the capacitor $C_2$ which is proportional to the charge taken up by the capacitor $C_1$. Hence, the capacitor $C_2$ will be successively charged more and more and the voltage across this capacitor will successively increase. Due to the resistor $R_2$, which functions as a leakage resistance, the capacitor $C_2$ will discharge somewhat between the various sensing occasions. The amount of the charge released by the capacitor $C_2$ will be dependent upon the resistance of the resistor $R_2$.

When the capacitor $C_2$ has been charged to a predetermined voltage, the second gate 6 will break or reduce the trigger voltage to the control electrode 4a of the thyristor 4. When this occurs the thyristor 4 will change to its non-conductive state when the alternating current source of electrical energy next passes through its zero value of voltage, thereby disconnecting the heating element 1 from the source of electrical energy 2, 3.

When the body of material in the cooking vessel 1a is relatively small, heating thereof to the boiling temperature, for example, will only take a short period of time and occur comparatively rapidly after heating thereof is started by the heating element 1. Under these conditions, the difference in voltage between the subsequent sensing occasions will be comparatively high at the first gate 5 and the capacitor $C_2$ will be charged to the predetermined voltage rather rapidly and render the gate 6 operable to change the thyristor 4 to its non-conductive state and disconnect the heating element 1 from the source of electrical energy. Hence, the number of sensing occasions will be comparatively small and the charge released from the capacitor $C_2$ by way of the resistor $R_2$ will be comparatively small.

When the body of material in the cooking vessel or objective of heating 1a is relatively large, heating thereof to a predetermined elevated temperature necessarily will take a longer period of time. Under these conditions, a comparatively large amount of charge will be discharged from the capacitor $C_2$ by way of the resistor $R_2$ which serves as a leakage resistor; and this will cause a delay in the increase of voltage across the capacitor $C_2$.

For example, if the ratio of heating time between the two aforementioned example is 1:2, the charging times of the capacitor $C_2$ will not be in the same proportion. When the heating objective is relatively large and the heating time ratio is 1:2, a still longer time must lapse before the capacitor $C_2$ will be charged to the voltage required. This is so because, when the heating objective is comparatively large, the latter must be heated to an elevated temperature which is nearer to a final temperature at which the source of electrical energy is disconnected from the heating element than when the heating objective is comparatively small, so that the residual heat of the heating element 1 will be precisely sufficient to continue heating the heating objective to the desired predetermined elevated temperature. In this way the electric heating system I have provided will function to heat the heating objective to the predetermined elevated temperature desired and overshooting of the last-mentioned elevated temperature will be avoided.

After the residual heat of the heating element 1a has been employed to continue heating the heating objective to the desired elevated temperature, the heating objective may be maintained substantially constant at this elevated temperature. I accomplish this by providing structure for the second gate 6 which functions to control the supply of electrical energy to the heating element 1 responsive to the elevated temperature to which it is desired to heat the heating objective.

When the voltage across the capacitor $C_2$ has been built-up to a predetermined value, the thyristor 11 will be triggered into its conductive state. The voltage developed in the conductor 10 will be sufficiently small so that the thyristor 4 will return to its non-conductive state. This is due to two factors, the first being the connection at 22 of conductor 19 to the negative source (−) of direct current at 22 and the second being the relative size of the resistors $R_3$ and $R_4$, composing a voltage divider, and the resistances developed by these resistors.

The thyristor 11 will continue to remain in its conductive state after the capacitor $C_2$ is discharged because of the difference in the voltage developed in the conductor 8 and the negative (−) voltage source at 22. In view of the remaining small increase in temperature, the charge built-up in the capacitor $C_2$ will be small during the operation of the heating system that will now be described. Moreover, no voltage differences will be developed in the gate 5 after the temperature becomes substantially constant and no further charges will be transferred to the capacitors $C_1$ or $C_2$.

When the objective of heating 1a has reached a predetermined elevated temperature derived from residual heat received directly from the heating element 1, the transistor 12 will become conductive due to the relative size of the resistors $R_5$ and $R_6$, composing a voltage divider, and the resistances developed by these resistors. When this occurs, the transistor 12 will short-circuit the resistor $R_4$ and the thyristor 11, thus causing the latter to return to its non-conductive state. The resistor $R_3$ and the transistor 12 may be referred to as a voltage divider, the transistor in its conductive state developing a very small resistance. Thus, the voltage developed in the conductor 10 will be still smaller keeping the thyristor 4 in its non-conductive state.

When the temperature of the objective of heating 1a subsequently decreases, thus decreasing the voltage developed in the conductor 8, the transistor 12 again will become non-conductive, thus transferring a positive voltage to the conductor 10 from the conductor 8. In this manner the thyristor 4 will be triggered to its conductive state and the circuit for the heating element 1 again will be completed for electrical energy to be supplied to the heating element. The continued control of the objective of heating 1a by the heating element 1 can be effected in the same manner between two temperature limits which lie very close to one another. The voltage developed in the conductor 20 by means of the voltage divider $R_5$–$R_6$ controls the transistor 12, which will be brought to its conductive or non-conductive state due to the varying voltage of the conductor 8. The ground provided at 23 for the conductor 10 through the resistor $R_7$ functions to serve as a reference potential.

FIGS. 1 and 2 are schematic and diagrammatically illustrate the basic principles of my improved heating system. As is mentioned in the foregoing, the conductor 13 may be grounded or connected to a reference potential, e.g. the negative source of direct current. This depends upon the characteristics of the thyristors and the transistor and the magnitude of the necessary control voltage of each of these components. The terminal 7 represents a source of supply for electrical impulses to be utilized to effect intermittent or periodical opening and closing of gate 5. In order to obtain reproducible results from my electric heating system well defined pulse trains should be used every time the system is taken into use. The simplest way of effecting this is to use a periodical pulse series.

As shown in FIG. 3, the arm 25 is provided with a bearing sleeve 26 rotatably mounted about a vertical axis in a bearing 27 supported at 28 in any suitable manner. When the arm 25 is journaled in the bearing 27, the lower end of the bearing sleeve 26 projects downward below the bearing 27. A clamp ring 30 is removably fixed to the lower projecting end of the bearing sleeve 26 by a locking screw 31.

The clamp ring 30 forms part of mechanism 29 which is moved and actuated by manual movement of the sensing arm 25 and acts and functions to hold the arm 25 either in its first active position in contact with the vessel 1a or in its second inactive position removed from the vessel 1a. The mechanism 29 comprises a spring device 32 including an elongated casing or spring cage 33 having a closed end from which a pin 35 projects, the outer end of the pin 35 being fixed to a vertical screw 36 turnable about a vertical axis in an internally threaded hollow sleeve 36a which is supported in any suitable manner.

A horizontally disposed pin 37 extends from the opposite open end of the cage 33 with its outer end hinged at 35a to the outer peripheral wall of the clamp ring 30. An elongated helical spring 34, which is disposed about the pin 37, extends between the fixed wall 37a within the cage 33 and the outer surface of the clamp ring 30, the right-hand end of the pin 37 being movable toward and from the wall 37a at 37b.

When the spring device 32 is in the position shown in FIG. 4, the parts just described are in an intermediate position with the spring 34 under compression. When the arm 25 is manually moved and turns the clamp ring 30 in one direction or the other about its vertical axis, the parts of the spring device 32 will assume either one of the two dotted line positions shown in FIG. 4. When this occurs, the spring 34 functions to bias and hold the clamp ring 30 in either of two positions which, in turn, will hold the sensing arm 25 in either of two positions which, as explained above, are its active and inactive positions in contact with and removed from the vessel 1a.

In view of the foregoing, it will be understood that my improved electric heating system provides an ideal solution to the problem of avoiding overshooting the predetermined elevated temperature to which it is desired to heat the primary objective of heating. Further, my improved electric heating system utilizes fully the residual heat of the heating element. Moreover, the components and parts of the electric heating system are conventional and readily obtainable. This produces an inexpensive and easily manufactured construction.

Although I have diagrammatically illustrated and described a particular embodiment of my invention, I do not desire to be limited to the particular arrangement set forth, and I intend in the following claims to cover all modifications which do not depart from the spirit and scope of my invention.

I claim:
1. The combination of
   (a) a main electrical circuit adapted to be connected to an alternating current source of electrical energy,
   (b) switching means including a thyristor having conductive and non-conductive states for connecting and disconnecting said main circuit to and from the alternating current source of electrical energy,
   (c) said main circuit including a heating element having a surface from which a primary objective of heating, such as a cooking vessel, for example, directly receives heat and increases in temperature while being heated by said heating element,
   (d) a control circuit controlling the state of said thyristor which comprises temperature sensing means operable in successive units of time to sense the increase in temperature of the heating objective at such sensing occasions, and
   (e) said control circuit including capacitance means and charging means to build up a charge across said capacitance means in response to the temperature sensing results of said temperature sensing means to change said thyristor to its non-conductive state and render said switching means operable to disconnect said main circuit from the source of electrical energy and deenergize said heating element at a particular time at which the residual heat in said heating element will continue heating of the objective of heating to a predetermined elevated temperature without overshooting such predetermined elevated temperature to which it is desired to heat the heating objective.

2. The combination set forth in claim 1 in which said temperature sensing means comprises a temperature sensing element, such as a thermistor, for example, operable to sense the temperature of the objective of heating and said charging means comprises first gating structure for intermittently transferring voltage charges in said control circuit from said temperature sensing element to said capacitance means to build up the voltage across said capacitance means, the voltage in said temperature sensing element being a function of the temperature of the heating objective.

3. The combination set forth in claim 2 which includes a first capacitor in said control circuit connected to said first gating structure, each voltage charge transferred to said first capacitor by said first gating structure being proportional to the difference in voltage transferred to said first capacitor between successive sensing occasions.

4. The combination set forth in claim 3 in which said capacitance means includes a second capacitor to which voltage is transferred in successive charges from said first gating structure, the magnitude of said last-mentioned voltage charges being proportional to the voltage charges building up the voltage across said first capacitor.

5. The combination set forth in claim 4 in which said control circuit includes a resistor serving as a leakage resistance which functions to release some of the voltage charge built up across said second capacitor between successive sensing occasions.

6. The combination set forth in claim 5 in which said control circuit includes second gating structure, said second gating structure being connected to said thyristor and functioning to change the latter to its non-conductive state resposive to a charge built up across said second capacitor to a predetermined voltage reached at said particular time.

7. The combination set forth in claim 6 in which said second gating structure includes means for controlling the energization of said heating element from the source of electrical energy after the residual heat of said heating element is substantially depleted and the heating objective has been heated to the predetermined elevated temperature.

References Cited

UNITED STATES PATENTS

| | | | |
|---|---|---|---|
| 2,963,566 | 12/1960 | Ross et al. | 219—516 |
| 3,003,048 | 10/1961 | Scott | 219—516 |
| 3,159,755 | 12/1964 | Duncan | 323—22 |
| 2,879,368 | 3/1959 | Strickland | 219—450 |
| 2,840,679 | 6/1958 | Hart | 219—450 |
| 2,819,371 | 1/1958 | Aldrich et al. | 219—450 XR |
| 3,431,399 | 3/1969 | Venning | 219—497 |
| 3,023,294 | 2/1962 | Severson et al. | 219—516 |

GEORGE HARRIS, Primary Examiner

F. E. BELL, Assistant Examiner

U.S. Cl. X.R.

219—501